(12) United States Patent
Lehtonen

(10) Patent No.: US 9,750,062 B2
(45) Date of Patent: Aug. 29, 2017

(54) ESTABLISHING A COMMUNICATION SESSION

(71) Applicant: TeliaSonera AB, Stockholm (SE)

(72) Inventor: Rami Lehtonen, Akaa (FI)

(73) Assignee: TeliaSonera AB, Stockholm (SE)

( * ) Notice: Subject to any disclaimer, the term of this patent is extended or adjusted under 35 U.S.C. 154(b) by 159 days.

(21) Appl. No.: 14/559,212

(22) Filed: Dec. 3, 2014

(65) Prior Publication Data
US 2015/0156804 A1    Jun. 4, 2015

(30) Foreign Application Priority Data

Dec. 3, 2013 (EP) ..................................... 13195489

(51) Int. Cl.
| | | |
|---|---|---|
| *H04W 76/02* | (2009.01) | |
| *H04M 3/42* | (2006.01) | |
| *H04M 7/00* | (2006.01) | |
| *H04L 29/06* | (2006.01) | |

(52) U.S. Cl.
CPC ....... *H04W 76/021* (2013.01); *H04L 65/1069* (2013.01); *H04M 3/42059* (2013.01); *H04M 7/0057* (2013.01); *H04M 2203/65* (2013.01); *H04M 2207/187* (2013.01)

(58) Field of Classification Search
CPC   H04W 76/021; H04W 76/02; H04L 65/1069; H04M 3/42059; H04M 7/0057; H04M 2203/65; H04M 2207/187
See application file for complete search history.

(56) References Cited

U.S. PATENT DOCUMENTS

| | | | |
|---|---|---|---|
| 2009/0144779 A1* | 6/2009 | Wan | ..................... H04L 65/1069 725/62 |
| 2009/0164645 A1 | 6/2009 | Sylvain | |
| 2014/0095633 A1* | 4/2014 | Yoakum | .................. H04L 51/12 709/206 |

FOREIGN PATENT DOCUMENTS

WO       2012052710 A1    4/2012

OTHER PUBLICATIONS

Rosenberg, J. SIP: Session Initiation Protocol. The Internet Society, Jun. 2002.
Bergkvist, Adam. WebRTC 1.0: Real-time Communication Between Browser & Apple Computer, Inc. et al. Sep. 10, 2013.
Series H: Audiovisual and Multimedia Systems—Infrastructure of audiovisual services—Systems and terminal equipment for audio-visual services. International Telecommunication Union, Dec. 2009.
(Continued)

*Primary Examiner* — Omar Ghowrwal
(74) *Attorney, Agent, or Firm* — Banner & Witcoff, Ltd.

(57) ABSTRACT

A method, a computer program product and a system for establishing a communication session on a mobile communication apparatus, comprising the mobile communication apparatus initiating a call to a second communication party, wherein the method comprises the steps of detecting an identification parameter of the second communication party from the call establishment data in a network element; sending as a response to the identification parameter from the network element to the mobile communication apparatus a message configured to start a data session application in the mobile communication apparatus; and said application establishing a data session with a server associated to the second communication party.

12 Claims, 1 Drawing Sheet

(56) References Cited

OTHER PUBLICATIONS

Series H: Audiovisual and Multimedia Systems—Infrastructure of audiovisual services—Systesm and terminal equipment for audiovisual services, Amendment 1: Use of Facility message to enable call transfer. International Telecommunication Union, Mar. 2013.
"Voice over IP", Wikipedia, Nov. 25, 2013. Retrieved Apr. 12, 2017.
"Voice over IP", CMP Books. Newton's Telecom Dictionary. Feb. 2002, p. 810.

\* cited by examiner

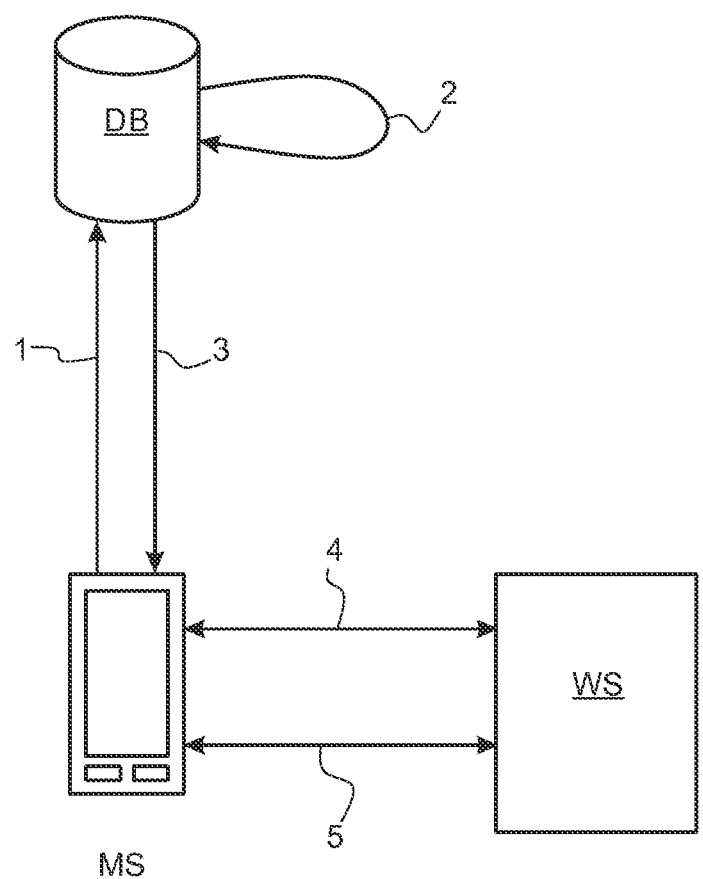

ESTABLISHING A COMMUNICATION SESSION

BACKGROUND

The invention relates to communications. More specifically, the invention relates to establishing a second communication session based on the call data.

Rich Communication Services is a global initiative program that aims to enhance telephone call services. One example of such services is Enriched Calls that enables multimedia content sharing during a voice call, video call and video sharing.

The traditional voice call is largely unaffected by rich services. The calling party may not be aware of the capabilities of the called party; therefore, many services may be left unused. Mobile users who make the call based on traditional end-points, such as the phone number or SIP URI, are not aware of the rich web services that could be connected to the end-point.

WebRTC provides the basic mechanisms of establishing the rich call functionality. WebRTC is a free, open project that enables web browsers with real-Time Communications (RTC). Current WebRTC solutions are so far browser focused and do not take into account the traditional ways to contact the end-point as triggers.

SUMMARY

The first aspect discloses a method for establishing a communication session on a mobile communication apparatus, comprising the mobile communication apparatus initiating a call to a second communication party. An example of a call is a voice call established between the calling and the called party and the application on the mobile communication apparatus is a voice call application. The method comprises the steps of detecting an identification parameter of the second communication party from the call establishment data in a network element; the network element sending to the mobile communication apparatus as a response to the identification parameter a message configured to start a data session application in the mobile communication apparatus; and said data session application establishing a data session with the second communication party. The session is established for example with a server associated to the second communication party or with the client application residing on the called party's terminal. The data session is used to enable the service having rich functionalities, for example during the call or in one example after the call.

The data session application is for example application software designed to run on a mobile communication apparatus such as a smartphone, tablet computer or other mobile device. The application is configured to run on a mobile operating system such as the operating systems known as "iOS," the operating systems known as "Android," or Windows Phone® operating system. In one exemplary embodiment of the method the data session application is representing data associated to the second communication party. The data is according to one example displayed on the screen of the mobile communication apparatus.

In one exemplary embodiment the data session is a WebRTC session. In one exemplary embodiment the data session application overrides the call application, for example a voice call application, being displayed on the screen of the mobile communication apparatus. In one exemplary embodiment the data session application is configured to display a graphical, interactive user interface object with which the user interacts in order to override the call application. The user is shown an icon or a similar object that he/she may respond to during or after the call to enable the rich communication service via the server connection.

The second aspect is a computer program product for establishing a communication session on a mobile communication apparatus, wherein the mobile communication apparatus is configured to initiate a call to a second communication party; and the first communication party comprises a mobile communication apparatus comprising a computer-readable medium bearing computer program code embodied therein for use with a computer, the computer program code comprising code for receiving a message configured to start a data session application during or after the initiated call in the mobile communication apparatus; and establishing a data session during or after the call with a server associated to the second communication party. An example of the computer program product is application software designed to run on a mobile communication apparatus.

In one exemplary embodiment the computer program code comprises code for representing, for example by displaying, data associated to the second communication party. In one exemplary embodiment the computer program code comprises code for establishing the data session as a WebRTC session. In one exemplary embodiment the computer program code comprises code for establishing the data session with the server according to the establishment data of a VoIP call. In one exemplary embodiment the computer program code comprises code for displaying a graphical, interactive user interface object on the screen of the mobile communication device, with which the user interacts in order to override the call application.

The third aspect discloses a system for establishing a communication session on a mobile communication apparatus, comprising the mobile communication apparatus configured to initiate a call, such as a voice call, to a second communication party and a network element configured to detect an identification parameter of the second communication party from the call establishment data. The mobile communication apparatus is connected to the network element by a communication network. The network element comprises means for sending, as a response to the identification parameter, to the mobile communication apparatus a message configured to start a data session application in the mobile communication apparatus. The mobile communication apparatus comprises means for receiving said message and starting the data session application; and means for establishing a data session with the second communication party.

In one exemplary embodiment the system comprises means for representing data associated to the second communication party. In one exemplary embodiment the system comprises the mobile communication apparatus comprising means for overriding the call application being displayed on the screen of the mobile communication apparatus. In one exemplary embodiment the system comprises the mobile communication apparatus being configured to display a graphical, interactive user interface object with which the user interacts in order to override the call application.

The present solution provides a solution for switching a traditional circuit switched call or VoIP call into a service call, where the service call may be WebRTC-based. The solution switches the call to a richer web calling session. The solution comprises for example a database where the end-point identification can be connected to the potentially available rich web service. This information is used to trigger the voice session switching into the WebRTC session or a similar web service. According to one aspect, the user interface of the mobile communication apparatus is modified according to the called party capabilities.

BRIEF DESCRIPTION OF THE DRAWINGS

The accompanying drawings, which are included to provide a further understanding and constitute a part of this specification, illustrate embodiments and together with the description help to explain the principles of the solution. In the drawings:

FIG. 1 is a block diagram illustrating the solution.

DETAILED DESCRIPTION

Reference will now be made in detail to the embodiments, examples of which are illustrated in the accompanying drawings.

FIG. 1 illustrates one example schematically. The mobile communication apparatus MS is for example a mobile phone, a smartphone, a mobile computing device such as a PDA, a laptop computer, a USB stick—basically any mobile device with wireless connectivity to a communication network. At least the calling party is connected to the wireless communication system. The other communication party may be connected to the same network by a mobile phone or to any IP network. The wireless communication network may comprise a wireless communication system such as GSM, 3G, UMTS, 4G or LTE.

In one embodiment the mobile communication apparatus MS initiates a voice call to the second communication apparatus, arrow 1. The call is established by a circuit switching call set-up according to the well-known procedure. One example of the call establishing application is the "Caller" application found in the "Android" mobile operating system. In one embodiment the call is established as a VoIP call.

The telephone operator comprises a network element DB that monitors or manages the call set-up procedure. An identification parameter is detected from the called party information. This identification parameter is for example an MSISDN number used in the signaling, a SIP-URI or similar identifying information used for call set-up. The network element DB is for example a function integrated to the Mobile Switching Center, Home Location Register HLR or any IP traffic management device. The network element DB is in one example a database that is configured to connect to the signaling means of the call establishment function.

The network element DB is configured to compare the identification parameter to the known parties configured operate with the Rich Communication Service, the capabilities of the calling or the called party. Examples of such Rich Communication Services are Internet based web services WS that utilize an IP connection and for example an Internet browser to present information or arrange bidirectional communication. Rich Communication Services have been registered to the network element DB. In this example the network element DB detects that the identification parameter is linked to a Rich Communication Service, arrow 2. In one example the database is first configured to detect if the called party has the capabilities to a Rich Communication Service, then the calling party capabilities.

The network element DB sends a trigger to the mobile communication apparatus for establishing a data session with the Rich Communication service, arrow 3. The network element comprises means for sending the trigger according to predetermined criteria, the means being for example a computer program product. Examples of the criteria are for example rules that take into account the time of the day, calling party capabilities or called party service load. For example a call center number may be queued and the call is redirected to Rich Communication Services informing the calling party of the situation such as the waiting time or introducing self-service options. An example of the trigger is a push notification message such as Apple Push Notification Service or Google Cloud Messaging.

The mobile communication apparatus MS receives the notification from the network element DB. The mobile communication apparatus according to this example is configured to operate by running different applications that are handled by the operating system. The call application is traditionally designed to have priority over another application, as the calling is deemed as the most important feature of a mobile phone, the mobile communication apparatus MS. The notification message starts a data session application.

Users can be transferred to richer functionalities during the call. In one embodiment the transfer to richer functionalities is performed after the call. Examples of the rich functionalities provided by the present solution comprise service selections when the customer calls into the customer care, giving feedback or offers to the customer during the call or after the call. The rich functionalities may be used to share files or data between the called and the calling party. The mobile communication apparatus MS establishes a call to richer functionalities. In one embodiment the voice session is established separately, arrows 4. The data session providing the Rich Communication Services is established in arrows 5. The data session is established with a server associated to the second communication party. The address of the server has been delivered to the mobile communication apparatus MS from the network element DB in the notification message.

In one embodiment the data session application is configured to override the call application. The user is for example prompted to reply whether the rich communication session is to be started. The user may be prompted about the possibility of additional services or the screen may comprise additional material or description about the rich services available. The prompt may be a visual object on the screen or voice information. In one embodiment the data session application starts a voice session with the web service WS and closes the call application. The data session may be established with the voice session or the data session may be run alone without any speech function or simultaneously with the call application.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

If desired, the different functions discussed herein may be performed in a different order and/or concurrently with each other.

Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for establishing a communication session on a mobile communication apparatus that initiates a voice call to a second communication party, the method comprising:
    detecting an identification parameter of the second communication party from voice call establishment data in a network element;
    determining whether the identification parameter of the second communication party is linked to a service; and
    sending, to the mobile communication apparatus and as a response to a determination that the identification parameter of the second communication party is linked to the service, a message configured to start a data session application in the mobile communication apparatus,
    wherein said data session application establishes a data session with the second communication party and closes a voice call application being displayed on a screen of the mobile communication apparatus.

2. The method according to claim 1, wherein the data session application represents data associated to the second communication party.

3. The method according to claim 1, wherein the data session comprises a WebRTC session.

4. The method according to claim 1, wherein the data session application is configured to display a graphical, interactive user interface object with which a user interacts in order to close the voice call application.

5. A computer program product for establishing a communication session on a mobile communication apparatus, the computer program product embodied on a non-transitory computer readable medium, comprising computer program code configured to, when executed on at least one processor, cause the mobile communication apparatus to:
    initiate a voice call to a second communication party;
    transmit data representing whether the mobile communication apparatus is linked to a service;
    in response to a determination that the mobile communication apparatus is linked to the service, receive a message configured to start a data session application during or after the initiated voice call in the mobile communication apparatus;
    establish a data session during or after the voice call with the second communication party; and
    display, on a screen of the mobile communication apparatus, a graphical, interactive user interface object with which a user interacts in order to close a voice call application.

6. The computer program product according to claim 5, the computer program code comprising code for representing data associated to the second communication party.

7. The computer program product according to claim 6, the computer program code comprising code for establishing the data session as a WebRTC session.

8. The computer program product according to claim 7, the computer program code comprising code for establishing the data session according to establishment data of a VoIP call.

9. A system for establishing a communication session on a mobile communication apparatus, comprising:
    the mobile communication apparatus configured to initiate a voice call to a second communication party;
    a network element configured to detect an identification parameter of the second communication party from voice call establishment data and to determine whether the identification parameter of the second communication party is linked to a service;
    the network element comprising means for sending, as a response to a determination that the identification parameter of the second communication party is linked to the service, to the mobile communication apparatus a message configured to start a data session application in the mobile communication apparatus;
    the mobile communication apparatus comprising means for receiving said message and starting the data session application;
    means for establishing a data session with the second communication party; and
    means for the data session application to close a voice call application being displayed on a screen of the mobile communication apparatus.

10. The system according to claim 9, wherein the mobile communication apparatus comprises means for representing data associated to the second communication party.

11. The system according to claim 9, wherein the data session is a WebRTC session.

12. The system according to claim 9, wherein the mobile communication apparatus is configured to display a graphical, interactive user interface object with which a user interacts in order to close the voice call application.

* * * * *